United States Patent Office 3,539,482
Patented Nov. 10, 1970

3,539,482
SOLUBLE POLY(ETHERURETHANE)S
Floyd D. Stewart, Akron, Ohio, assignor to The B. F. Goodrich Company, New York, N.Y., a corporation of New York
No Drawing. Filed Sept. 20, 1967, Ser. No. 669,286
Int. Cl. C08g 22/14, 51/24
U.S. Cl. 260—29.2                8 Claims

ABSTRACT OF THE DISCLOSURE

Poly(etherurethane)s which are soluble in water or in dilute aqueous alkali solutions are prepared by reacting poly(oxyethylene)glycols having molecular weights greater than about 1000 with an alkylene glycol and an aliphatic or phenyl diisocyanate in a molar ratio of 1 mol of poly(oxyethylene)glycol, 1 to 2 mols of alkylene glycol and 2 to 3 mols of the diisocyanate.

BACKGROUND OF THE INVENTION

The cure times of sulfur-vulcanizable unsaturated elastomer compounds containing sulfur and accelerator are effectively reduced when such compounds contain small amounts of poly(etherurethane)s. While the poly(etherurethane)s in solid form may be mixed with the elastomer on a mill or in an internal mixer it is often desirable to add the poly(etherurethane) to the elastomer in latex form for faster and improved mixing, and for latex applications. Poly(etherurethane)s are prepared in the absence of water and are soluble only in highly polar organic solvents and are normally insoluble in water. Aqueous solutions of poly(etherurethane)s are desired for mixing with elastomer latices; and in addition, would have other uses as coatings, in adhesives and the like, without the necessity for using expensive and toxic organic solvents.

SUMMARY OF THE INVENTION

I have now found, quite unexpectedly, that water and alkali-soluble poly(etherurethane)s are prepared from poly(oxyethylene)glycols, alkylene glycols and organic diisocyanates by observing several critical factors. In order to obtain these soluble poly(etherurethane)s, the molecular weight of the poly(oxyethylene)glycol must be greater than 1000, the organic diisocyanate is an aliphatic diisocyanate or a mono-phenyl diisocyanate, and the molar ratio of reactants is one mol of poly(oxyethylene)glycol, 1 to 2 mols of alkylene glycol and 2 to 3 mols of the defined diisocyanate, reacted in proportion so that there is essentially no excess isocyanate groups in the poly(etherurethane). Poly(etherurethane)s so prepared are substantially soluble in water or in dilute aqueous alkali solutions such as 1% sodium hydroxide.

DETAILED DESCRIPTION

The molecular weight of the poly(oxyethylene)glycol must be greater than about 1000 and may be as high as 3500 or more. Preferably the poly(oxyethylene)glycol has a molecular weight from about 1100 to about 3000.

The alkylene glycols normally will contain from about 2 to 8 carbon atoms, including, for example, ethylene glycol, propylene glycol, butylene glycol, pentamethylene glycol, hexamethylene glycol and the like. More preferably the glycols contain 2 to 6 carbon atoms, and have the general formula $HO(CH_2)_nOH$ wherein $n$ is 2 to 6.

The organic diisocyanate is an aliphatic diisocyanate or a mono-phenyl diisocyanate including, for example, hexamethylene diisocyanate, tolylene diisocyanates, phenylene diisocyanates and the like wherein the aromatic diisocyanate contains only one phenyl nucleus.

The ratio of reactants is based on one mol of poly(oxyethylene)glycol, about 1 to 2 mols of alkylene glycol and about 2 to 3 mols of organic diisocyanate, preferably with the molar amounts of diisocyanate substantially equivalent to the total molar amount of poly(oxyethylene)glycol and other alkylene glycol. While equimolar reactant ratios are preferred, some deficiency of diisocyanate, preferably no less than 10 mol percent, may be used in preparing the poly(etherurethane)s.

The poly(etherurethane)s are normally prepared under essentially anhydrous conditions with dry reactants. In preparing the poly(etherurethane)s of the examples, a standard procedure was followed. The specified molar amounts of poly(oxyethylene)glycol and alkylene glycol were melted in a reactor and stirred at a pressure of 5 to 6 mm. at 100 to 110° C. to remove moisture. To this mixture there was then added the organic diisocyanate and after stirring to obtain complete mixing, the mixture was poured into a silicone-coated container which was sealed and heated to 140° C. for about 3 hours. Reaction temperatures between 100 to 200° C. or more may be employed.

While the solubility of the poly(etherurethane)s of this invention are demonstrated in 1% aqueous sodium hydroxide solutions, the poly(etherurethane)s obviously are readily soluble in more concentrated alkali solutions. For many applications the less concentrated alkali solutions are desired. Further, many of these poly(etherurethane)s are soluble, at least to some extent, in water, for example, the poly(etherurethane) prepared from 1 mol of poly(oxyethylene)glycol molecular weight 1357, 1 mol of 1,4-butanediol and 2 mols of hexamethylene diisocyanate is about 60% soluble in distilled water. The concentration of alkali in water employed will depend to some extent upon the concentration of poly(etherurethane) in water desired and the end applications of the solutions. Useful alkali materials which have been employed include lithium hydroxide, sodium hydroxide, potassium hydroxide, ammonium hydroxide, and less desirably but useful, barium hydroxide, and the like. The aqueous alkali solutions used to prepare the solutions of poly(etherurethane) will have a pH greater than about 8, more preferably a pH greater than about 12.

EXAMPLE I

To demonstrate the effect on solubility of the molecular weight of the poly(oxyethylene)glycol, a series of four poly(etherurethane)s were prepared with molar ratios of one mol of poly(oxyethylene)glycol, one mol of 1,4-butanediol and 2 mols of a mixture of 80% 2,4-tolylene diisocyanate and 20% 2,6-tolylene diisocyanate, the molecular weight of the poly(oxyethylene)glycol being the only variable. Poly(etherurethane)s prepared with poly(oxyethylene)glycols having molecular weights of 601 and 967 were substantially insoluble in 1% aqueous sodium hydroxide solutions while a poly(etherurethane) made from a poly(oxyethylene)glycol having a molecular weight of 1357 was completely soluble in the 1% sodium hydroxide solutions to form a solution containing 10 weight percent dissolved poly(etherurethane). In testing solubility 2 grams of polymer were added to 18 grams of the sodium hydroxide solution and the mixture rolled for 24 hours at room temperature. A poly(etherurethane) made from poly(oxyethylene)glycol having a molecular weight of 2826 was substantially completely soluble in 1% sodium hydroxide solution, a solution made from 3 grams of polymer of the poly(etherurethane) and 27 grams of 1% sodium hydroxide having a polymer total solids equivalent to a 10 weight percent solution of the poly(etherurethane) in water. This poly(etherurethane) dissolved in water to form a 10 percent gelled solution. In another example a poly(etherurethane) was prepared from one mol of poly(oxyethylene)glycol of molecular weight 1357, 1 mol of ethylene glycol and 2 mols of 80/20 tolylene diisocyanate. A 9.8% solution of poly (etherurethane) in 1% sodium hydroxide was readily prepared.

EXAMPLE II

Poly(etherurethane)s prepared from poly(tetramethylene oxide)glycol having molecular weights of 1020 and 2080 were prepared from reactants in a molar ratio of 1 mol of poly(tetramethylene oxide)glycol with 1 mol of 1,4-butanediol and 2 mols of the 80/20 tolylene diisocyanate mixture as described above. Both poly(etherurethane)s were substantially insoluble in 1% aqueous sodium hydroxide solutions.

EXAMPLE III

Additional poly(etherurethane)s were prepared in accordance with the procedure described above with poly (oxyethylene)glycol having a molecular weight of 1357 and 1,4-butanediol, with other organic diisocyanates, in molar ratios of one mol of poly(oxyethylene)glycol, one mol of 1,4-butanediol and 2 mols of (1) para-phenylene diisocyanate, (2) hexamethylene diisocyanate and (3) diphenylmethane - p,p' - diisocyanate. The poly(etherurethane) of the diphenylmethane - p,p' - diisocyanate was essentially insoluble in 1% sodium hydroxide solution; the poly(etherurethane) prepared with hexamethylene diisocyanate was soluble in the 1% sodium hydroxide solution as was the poly(etherurethane) prepared with para-phenylene diisocyanate.

EXAMPLE IV

The ratio of reactants is also critical, and to demonstrate this, a poly(etherurethane) was prepared in molar ratios of 1 mol of poly(oxyethylene)glycol molecular weight 1357, 3 mols of 1,4-butanediol and 4 mols of 80/20 tolylene diisocyanate mixture. The resulting poly (etherurethane) was substantially insoluble in 1% sodium hydroxide solution.

An SBR latex of a copolymer of about 23.5% bound styrene with the remainder butadiene-1,3, in a total solids concentration of about 20%, was mixed with a 10% solution in 1% sodium hydroxide of a poly(etherurethane) prepared from poly(oxyethylene)glycol having a molecular weight of 1357, 1,4-butanediol and 80/20 tolylene diisocyanate in a molar ratio of 1:1:2, in an amount to provide 1 part of the poly(etherurethane) per hundred of SBR polymer. This mixture was coagulated with salt-acid, washed and dried. The mixture was then compounded on a basis of 100 parts of polymer mixture with 3 parts of zinc oxide, 40 parts of ISAF carbon black, 1.5 parts of lauric acid, 5 parts of naphthenic processing oil, 1.2 parts of sulfur and 2.0 parts of N-cyclohexyl-2-benzothiazylsulfenamide and the optimum cure time determined in accordance with the article "The Viscurometer—An Instrument to Assess Processing Characteristics," A. E. Juve et al., Rubber World, December, 1963, pages 43–49.

The SBR containing the poly(etherurethane) had a cure rate almost twice as fast as the SBR which did not contain the poly(etherurethane).

The soluble poly(etherurethane)s in water or alkali solutions also may be used to impregnate paper and non-woven fabrics, used as a coating material, and as an adhesive ingredient in water-based adhesive compositions.

I claim:

1. A poly(etherurethane) comprising the reaction product of reactants consisting essentially of a poly(oxyethylene)glycol having a molecular weight greater than about 1000 to about 3500, an alkylene glycol containing 2 to 8 carbon atoms and an organic diisocyanate selected from the group consisting of aliphatic diisocyanates and mono-phenyl diisocyanates, reacted in a molar ratio of one mol of poly(oxyethylene)glycol, 1 to 2 mols of alkylene glycol and 2 to 3 mols of organic diisocyanate wherein the resulting poly(etherurethane) is substantially free of unreacted isocyanate groups.

2. The poly(etherurethane) of claim 1 wherein the molecular weight of the poly(oxyethylene)glycol is from about 1100 to about 3000, the alkylene glycol has the formula $HO(CH_2)_nOH$ wherein $n$ is 2 to 6 and the organic diisocyanate is selected from the group consisting of hexamethylene diisocyanate and tolylene diisocyanate.

3. The poly(etherurethane) of claim 2 wherein the molecular weight of the poly(oxyethylene)glycol is about 1300 to about 28000, $n$ is 2 to 4 and the molar ratio of reactants is about 1 mol of poly(oxyethylene)glycol, 1 mol of alkylene glycol and 2 mols of organic diisocyanate.

4. The poly(etherurethane) of claim 3 wherein the alkylene glycol is ethylene glycol and the organic diisocyanate is hexamethylene diisocyanate.

5. The poly(etherurethane) of claim 3 wherein the alkylene glycol is butanediol-1,4 and the organic diisocyanate is hexamethylene diisocyanate.

6. The poly(etherurethane) of claim 3 wherein the alkylene glycol is ethylene glycol and the organic diisocyanate is a tolylene diisocyanate.

7. The poly(etherurethane) of claim 3 wherein the alkylene glycol is butanediol-1,4 and the organic diisocyanate is a tolylene diisocyanate.

8. An aqueous solution of a poly(etherurethane) of claim 1.

References Cited

UNITED STATES PATENTS

| | | | |
|---|---|---|---|
| 2,929,800 | 3/1960 | Hill | 260—77.5 |
| 3,188,302 | 6/1965 | Lorenz | 260—77.5 |
| 3,242,230 | 3/1966 | Habib | 260—29.2 |

DONALD J. ARNOLD, Primary Examiner

A. H. KOECKERT, Assistant Examiner

U.S. Cl. X.R.

260—29.7, 77.5, 859